(12) United States Patent
Pelliconi et al.

(10) Patent No.: US 7,592,393 B2
(45) Date of Patent: Sep. 22, 2009

(54) SOFT POLYOLEFIN COMPOSITIONS

(75) Inventors: Anteo Pelliconi, Occhiobello (IT); Enea Garagnani, Ferrara (IT); Alvaro Villanueva, Madrid (ES)

(73) Assignee: Basel Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/484,909

(22) PCT Filed: Apr. 8, 2002

(86) PCT No.: PCT/EP02/03880

§ 371 (c)(1), (2), (4) Date: Jan. 26, 2004

(87) PCT Pub. No.: WO03/011962

PCT Pub. Date: Feb. 13, 2003

(65) Prior Publication Data

US 2004/0198919 A1    Oct. 7, 2004

(30) Foreign Application Priority Data

Jul. 27, 2001    (EP) ................... 01202876

(51) Int. Cl.
- *C08F 297/08* (2006.01)
- *C08F 10/02* (2006.01)
- *C08F 10/06* (2006.01)
- *C08F 2/00* (2006.01)
- *C08L 23/10* (2006.01)

(52) U.S. Cl. ...................... 525/191; 525/240

(58) Field of Classification Search ................. 525/191, 525/240

See application file for complete search history.

(56) References Cited

U.S. PATENT DOCUMENTS

| | | | |
|---|---|---|---|
| 4,399,054 A | 8/1983 | Ferraris et al. | 252/429 B |
| 4,472,524 A | 9/1984 | Albizzati | 502/113 |
| 4,710,262 A | 12/1987 | Weed | |
| 5,145,819 A | 9/1992 | Winter et al. | 502/117 |
| 5,229,463 A * | 7/1993 | Yano et al. | 525/240 |
| 5,324,800 A | 6/1994 | Welborn, Jr. et al. | 526/160 |
| 6,861,476 B2 * | 3/2005 | Braga et al. | 525/191 |
| 2005/0165171 A1 * | 7/2005 | Pelliconi et al. | 525/240 |

FOREIGN PATENT DOCUMENTS

| | | |
|---|---|---|
| EP | 0045977 | 2/1982 |
| EP | 0129368 | 12/1984 |
| EP | 178631 | 4/1986 |
| EP | 0361493 | 4/1990 |
| EP | 0373660 | 6/1990 |
| EP | 0416815 | 3/1991 |
| EP | 0420436 | 4/1991 |
| EP | 0472946 | 3/1992 |
| EP | 0485823 | 5/1992 |
| EP | 0643066 | 3/1995 |
| EP | 0671404 | 9/1995 |
| EP | 0728769 | 8/1996 |
| JP | 58-162621 | 9/1983 |
| JP | 61-095017 | 5/1986 |
| JP | 61-120834 | 6/1986 |
| JP | 61-152442 | 7/1986 |
| JP | 06-329737 | 11/1994 |
| WO | 9104257 | 4/1991 |

* cited by examiner

*Primary Examiner*—Nathan M Nutter
(74) *Attorney, Agent, or Firm*—Jarrod N. Raphael

(57) ABSTRACT

A polyolefin composition comprising: (A) from 8 to 25% by weight of a crystalline homopolymer or copolymer of propylene: (B) from 75 to 92% by weight of an elastomeric fraction comprising: (1) a first elastomeric copolymer of propylene with from 15 to 32% by weight at least one alpha-olefin of formula $H_2C=CHR$, where R is H or a $C_{2-6}$ linear or branched alkyl, optionally containing 0.5 to 5% by weight of a diene, said first elastomeric copolymer containing alpha-olefin, and having solubility in xylene at room temperature greater than 50% by weight, the intrinsic viscosity of the xylene soluble fraction ranging from 3.0 to 5.0 dl/g; and (2) a second elastomeric copolymer of propylene with at least one alpha-olefin of formula $H_2C=CHR$, where R is H or a $C_{2-6}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g; the (1)/(2) weight ratio ranging from 1:5 to 5:1.

43 Claims, No Drawings

SOFT POLYOLEFIN COMPOSITIONS

This application is the U.S. national phase of International Application PCT/EP02/03880, filed Apr. 8, 2002.

The present invention concerns soft, highly flexible polyolefin compositions and a process for their preparation.

BACKGROUND OF THE INVENTION

Polyolefin compositions having elastic properties while maintaining a good thermoplastic behavior have been used in many application fields, due to the valued properties which are typical of polyolefins (such as chemical inertia, mechanical properties and nontoxicity). Moreover, they can be advantageously transformed into finished products with the same techniques used for thermoplastic polymers.

In particular, flexible polymer materials are widely used in the medical field (e.g. in the production of containers for plasma or intravenous solutions, or phleboclysis tubes), as well as for packaging, extrusion coating and electrical wires and cables covering.

In many of these applications, vinyl chloride polymers containing adequate plasticizers, which are necessary to give said polymers their desired flexibility characteristics, are presently used. Said polymer products, however, are subject to ever increasing criticism both for the suspected toxicity of the plasticizers they contain and because when incinerated, they can disperse into the atmosphere extremely toxic by-products, such as dioxin. It would be very useful, therefore, to substitute said materials with products which besides the desired flexibility characteristics and, optionally, transparency, would have the chemical inertia and nontoxicity typical of olefin polymers.

Elastic polypropylene compositions retaining good thermoplastic behavior has been obtained in the art by way of sequential copolymerization of propylene, optionally containing minor quantities of olefin comonomers, and then ethylene/propylene or ethylene/alpha-olefin mixtures. Catalysts based on halogenated titanium compounds supported on magnesium chloride were commonly used for this purpose.

For instance, EP-A-400 333 describes elastoplastic polyolefin compositions obtained by sequential polymerization comprising:
A) 10-60 parts by weight of a crystalline polymer or copolymer of propylene;
B) 10-40 parts by weight of a polymer fraction containing ethylene, insoluble in xylene at ambient temperature; and
C) 30-60 parts by weight of an ethylene/propylene copolymer fraction, soluble in xylene at room temperature.

Said compositions are relatively flexible and have good elastic properties, as demonstrated by flexural modulus lower than 700 MPa values (the compositions prepared in the working examples of this document show flexural modulus values ranging from 270 to 350 MPa), associated to good tension set values; nevertheless, such values are not fully satisfactory for many applications and the compositions do not have satisfactory optical properties, such as transparency. Satisfactory transparency characteristics can be obtained in compositions prepared by sequential polymerization, when the content of the crystalline polymer produced in the first stage of polymerization is relatively high; nevertheless, the presence of high amounts of crystalline fraction is detrimental to elasticity and flexibility properties.

EP-A-373 660 describes polypropylene compositions, obtained by sequential polymerization, containing (A) from 70 to 98% by weight of a crystalline copolymer of propylene and (B) from 2 to 30% by weight of an elastomeric copolymer of ethylene with propylene and/or another alpha-olefin, whose portion soluble in xylene has an intrinsic viscosity which satisfies a particular correlation with the one of the crystalline copolymer. These compositions however, although having good optical qualities, show high flexural modulus values (typically higher than 600 MPa), due to the high content of crystalline copolymer (A). WO 00/11057 describes a process for the preparation of heterophasic polyolefin compositions comprising:

i) a polymerization stage carried out in the presence of a Ziegler-Natta catalyst, to produce a) a crystalline homo or copolymer of propylene and/or ethylene, and b) an elastomeric copolymer of ethylene with a $C_3$-$C_{10}$ alpha-olefin;
ii) a treatment stage to deactivate the Ziegler-Natta catalyst and to add a metallocene catalyst; and
iii) a polymerization stage carried out in the presence of the metallocene catalyst, to produce an elastomeric copolymer of ethylene with a $C_3$-$C_{10}$ alpha-olefin, preferably containing 50-75% by weight of ethylene.

EP-A-472 946 describes flexible elastoplastic polyolefin compositions comprising, in parts by weight:
A) 10-50 parts of an isotactic propylene homopolymer or copolymer;
B) 5-20 parts of an ethylene copolymer, insoluble in xylene at room temperature; and
C) 40-80 parts of an ethylene/propylene copolymer containing less than 40% by weight of ethylene and being soluble in xylene at room temperature; the intrinsic viscosity of said copolymer is preferably from 1.7 to 3 dl/g. Said compositions have a flexural modulus of less than 150 MPa; a tension set, at 75% elongation, of 20-50%, and at 100% elongation of about 33-40%; Shore D hardness from 20 and 35, and Shore A hardness of about 90. These mechanical properties, though advantageous with respect to the compositions known in the prior art, are still not fully satisfactory for certain applications. In particular, more flexible polymers are required for medical applications, as well as for packaging, for calendered materials, for extrusion coating, and for electrical wires and cables covering.

Therefore, there is a need for more flexible polyolefin compositions, having lower flexural modulus values, while maintaining acceptable optical properties.

SUMMARY OF THE INVENTION

The present invention concerns a polyolefin composition comprising the following fractions:
(A) from 8 to 25% by weight of a crystalline polymer fraction selected from the group consisting of:
  (i) a propylene homopolymer, having solubility in xylene at room temperature lower than 10% by weight; and
  (ii) a copolymer of propylene and at least one alpha-olefin of formula $H_2C=CHR$, where R is H or a $C_{2-6}$ linear or branched alkyl, containing at least 85% by weight of propylene, having solubility in xylene at room temperature lower than 15% by weight;
(B) from 75 to 92% by weight of an elastomeric fraction comprising:
  (1) a first elastomeric copolymer of propylene with at least one alpha-olefin of formula $H_2C=CHR$, where R is H or a $C_{2-6}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and (2) a second elastomeric copolymer of propylene with at least one alpha-olefin of formula $H_2C=CHR$, where R is H or a $C_{2-6}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;

the (1)/(2) weight ratio ranging from 1:5 to 5:1. The polyolefin composition of the invention, preferably prepared by sequential polymerization in at least two stages, has a flexural modulus lower than 60 MPa, Shore A hardness lower than 90, and tension set at 100% lower than 35%. The present invention is further directed to a process for the preparation of the polyolefin composition reported above, comprising at least two sequential polymerization stages with each subsequent polymerization being conducted in the presence of the polymeric material formed in the immediately preceding polymerization reaction, wherein the crystalline polymer fraction (A) is prepared in at least one first stage, and the elastomeric fraction (B) is prepared in at least one second stage. According to a preferred embodiment, all the polymerization stages are carried out in the presence of a catalyst comprising a trialkylaluminum compound, optionally an electron donor, and a solid catalyst component comprising a halide or halogen-alcoholate of Ti and an electron donor compound supported on anhydrous magnesium chloride, said solid catalyst component having a surface area (measured by BET) of less than 200 m$^2$/g, and a porosity (measured by BET) higher than 0.2 ml/g.

DETAILED DESCRIPTION OF THE INVENTION

The polyolefin compositions of the invention exhibit very low flexural modulus values, at the same time retaining the mechanical and optical properties of less flexible compositions. These polyolefin compositions comprise from 8 to 25% by weight, preferably from 10 to 20%, and even more preferably from 12 to 18% of crystalline polymer fraction (A), and from 75 to 92% by weight, preferably from 80 to 90%, and even more preferably from 82 to 88% of elastomeric fraction (B). The crystalline polymer fraction (A) of the compositions of the invention is (i) a propylene homopolymer or (ii) a copolymer of propylene with at least one alpha-olefin of formula $H_2C=CHR$, where R is H or a $C_{2-6}$ linear or branched alkyl. The homopolymer (i) has solubility in xylene at room temperature lower than 10% by weight, preferably lower than 5%, and even more preferably lower than 3%. By "room temperature" is meant herein a temperature of about 25° C.

The copolymer of propylene (ii) contains at least 85% by weight of propylene, preferably at least 90% propylene, and has solubility in xylene at room temperature lower than 15% by weight, preferably lower than 10%, and even more preferably lower than 8%. Said alpha-olefin is preferably ethylene, butene-1, pentene-1, 4-methylpentene, hexene-1, octene-1 or combinations thereof, and even more preferably the copolymer of propylene (ii) is a copolymer of propylene and ethylene.

Copolymers of propylene with ethylene or an alpha-olefin or a combination thereof are preferred (A) components, because they confer high transparency to the compositions of the invention. The elastomeric fraction (B) of the polyolefin compositions of the invention comprises a first elastomeric copolymer (1) and a second elastomeric copolymer (2). By "elastomeric" is meant herein a polymer having low crystallinity or amorphous, having a solubility in xylene at room temperature greater than 50% by weight.

The first elastomeric copolymer (1) is a copolymer of propylene with at least one alpha-olefin of formula $H_2C=CHR$, where R is H or a $C_{2-6}$ linear or branched alkyl, optionally containing 0.5 to 5% by weight of a diene; said alpha-olefin is preferably ethylene, butene-1, hexene-1 or octene-1, and even more preferably is ethylene. The alpha-olefin content ranges from 15 to 32% by weight, preferably from 25 to 30%. The elastomeric copolymer (1) has a solubility in xylene at room temperature greater than 50% by weight, preferably greater than 70%, and even more preferably greater than 80%; the intrinsic viscosity of the xylene soluble fraction ranges from 3.0 to 5.0 dl/g, more preferably from 3.5 to 4.5 dl/g, and even more preferably from 3.8 to 4.3 dl/g. The second elastomeric copolymer (2) is a copolymer of propylene with at least one alpha-olefin of formula $H_2C=CHR$, where R is H or a $C_{2-6}$ linear or branched alkyl, optionally containing 0.5 to 5% by weight of a diene; said alpha-olefin is preferably ethylene, butene-1, hexene-1 or octene-1, and even more preferably is ethylene. The alpha-olefin content is greater than 32% up to 45% by weight, and preferably ranges from 35 to 40%. The elastomeric copolymer (2) has solubility in xylene at room temperature greater than 80% by weight, preferably greater than 85%, and the intrinsic viscosity of the xylene soluble fraction ranges from 4.0 to 6.5 dl/g, preferably from 4.5 to 6.0, and more preferably from 5.0 to 5.7 dl/g. As previously reported, the copolymerization of propylene and ethylene or another alpha-olefin or combinations thereof, to form the copolymers (1) and (2) of the elastomeric fraction (B) can occur in the presence of a diene, conjugated or not, such as butadiene, 1,4-hexadiene, 1,5-hexadiene and ethylidene-norbornene-1. The diene, when present, is contained in an amount of from 0.5 to 5% by weight, with respect to the weight of the fraction (B).

The weight ratio of the elastomeric copolymers (1)/(2) ranges from 1:5 to 5:1.

The polyolefin composition of the invention has a flexural modulus lower than 60 MPa, preferably from 10 to 50 MPa; Shore A hardness lower than 90, preferably from 65 to 80; and tension set at 100% lower than 35%, preferably from 10 to 30%.

Moreover, the composition can present crystallinity deriving from poly-alpha-olefin sequences, and preferably from polyethylene sequences, due to the partial formation of such sequences in the polymerization of the elastomeric copolymers (B)(1) and (2). This crystallinity may be detected by measuring the heat of fusion deriving from poly-alpha-olefin sequences (e.g. PE enthalpy) by means of Differential Scanning Calorimetry (DSC) analysis; in DSC, the composition may present at least a melting peak attributable to a crystalline PE phase, i.e. to $(CH_2)_n$ sequences of the crystalline type. In the compositions of the invention, the heat of fusion of peaks present below 130° C. and attributable to polyethylene sequences is preferably greater than 3 J/g. According to a preferred embodiment of the invention, the polyolefin composition is in the form of spherical particles having an average diameter of 250 to 7,000 microns, a flowability of less than 30 seconds and a bulk density (compacted) greater than 0.4 g/ml. The polyolefin composition of the invention may be prepared by sequential polymerization in at least two stages; according to a preferred embodiment, the sequential polymerization is carried out in the presence of a catalyst comprising a trialkylaluminum compound, optionally an electron donor, and a solid catalyst component comprising a halide or halogen-alcoholate of Ti and an electron-donor compound supported on anhydrous magnesium chloride.

Therefore, the present invention is further directed to a process for the preparation of the polyolefin compositions as reported above, said process comprising at least two sequential polymerization stages with each subsequent polymerization being conducted in the presence of the polymeric material formed in the immediately preceding polymerization reaction, wherein the crystalline polymer fraction (A) is prepared in at least one first stage, and the elastomeric fraction (B) is prepared in at least one second stage. The polymerization stages may be carried out in the presence of a Ziegler-Natta and/or a metallocene catalyst.

According to a preferred embodiment, all the polymerization stages are carried out in the presence of a catalyst comprising a trialkylaluminum compound, optionally an electron donor, and a solid catalyst component comprising a halide or halogen-alcoholate of Ti and an electron-donor compound supported on anhydrous magnesium chloride. Catalysts having the above mentioned characteristics are well known in the patent literature; particularly advantageous are the catalysts described in U.S. Pat. No. 4,399,054 and EP-A-45 977. Other examples can be found in U.S. Pat. No. 4,472,524. The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are phthalic acid esters, such as diisobutyl, dioctyl, diphenyl and benzylbutyl phthalate.

Other electron-donors particularly suitable are 1,3-diethers of formula:

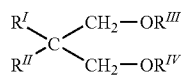

wherein $R^I$ and $R^{II}$, the same or different from each other, are $C_1$-$C_{18}$ alkyl, $C_3$-$C_{18}$ cycloalkyl or $C_7$-$C_{18}$ aryl radicals; $R^{III}$ and $R^{IV}$, the same or different from each other, are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are described in EP-A-361 493 and EP-A-728 769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis(methoxymethyl)fluorene.

The preparation of the above mentioned catalyst components is carried out according to various methods. For example, a MgCl$_2$.nROH adduct (in particular in the form of spheroidal particles) wherein n is generally from 1 to 3 and ROH is ethanol, butanol or isobutanol, is reacted with an excess of TiCl$_4$ containing the electron-donor compound. The reaction temperature is generally from 80 to 120° C. The solid is then isolated and reacted once more with TiCl$_4$, in the presence or absence of the electron-donor compound, after which it is separated and washed with aliquots of a hydrocarbon until all chlorine ions have disappeared. In the solid catalyst component the titanium compound, expressed as Ti, is generally present in an amount from 0.5 to 10% by weight.

The quantity of electron-donor compound which remains fixed on the solid catalyst component generally is 5 to 20% by moles with respect to the magnesium dihalide. The titanium compounds which can be used in the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates. The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or SO$_4$ or SO$_3$ groups. The Al-alkyl compound is generally used in such a quantity that the Al/Ti ratio be from 1 to 1000. The electron-donor compounds that can be used as external donors include aromatic acid esters such as alkyl benzoates, and in particular silicon compounds containing at least one Si—OR bond, where R is a hydrocarbon radical. Examples of silicon compounds are (tert-butyl)$_2$Si(OCH$_3$)$_2$, (cyclohexyl)(methyl) Si(OCH$_3$)$_2$, (phenyl)$_2$Si(OCH$_3$)$_2$ and (cyclopentyl)$_2$Si(OCH$_3$)$_2$. 1,3-diethers having the formulae described above can also be used advantageously. If the internal donor is one of these diethers, the external donors can be omitted. The solid catalyst component have preferably a surface area (measured by BET) of less than 200 m$^2$/g, and more preferably ranging from 80 to 170 m$^2$/g, and a porosity (measured by BET) preferably greater than 0.2 ml/g, and more preferably from 0.25 to 0.5 ml/g. The catalysts may be precontacted with small quantities of olefin (prepolymerization), maintaining the catalyst in suspension in a hydrocarbon solvent, and polymerizing at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst. By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/ml. Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815, EP-A-0 420 436, EP-A-0 671 404, EP-A-0 643 066 and WO 91/04257.

These metallocene compounds may be advantageously used to produce the elastomeric copolymers (B)(1) and (B)(2). According to a preferred embodiment, the polymerization process of the invention comprises three stages, all carried out in the presence of Ziegler-Natta catalysts, where: in the first stage the relevant monomer(s) are polymerized to form the fraction (A); in the second stage a mixture of ethylene and propylene, of propylene and another alpha-olefin, or of ethylene, propylene and another alpha-olefin and optionally a diene are polymerized to form the elastomeric copolymer (B)(1); and in the third stage a mixture of ethylene and propylene, or of propylene and another alpha-olefin, or of ethylene, propylene and another alpha-olefin and optionally a diene are polymerized to form the elastomeric copolymer (B)(2). The polymerization stages may occur in liquid phase, in gas phase or liquid-gas phase. Preferably, the polymerization of the crystalline polymer fraction (A) is carried out in liquid monomer (e.g. using liquid propylene as diluent), while the copolymerization stages of the elastomeric copolymers (B)(1) and (B)(2) are carried out in gas phase, without intermediate stages except for the partial degassing of the propylene. According to a most preferred embodiment, all the three sequential polymerization stages are carried out in gas phase. The reaction temperature in the polymerization stage for the preparation of the crystalline polymer fraction (A) and in the preparation of the elastomeric copolymers (B)(1) and (B)(2) can be the same or different, and is preferably from 40° C. to 90° C.; more preferably, the reaction temperature ranges from 50 to 80° C. in the preparation of the fraction (A), and from 40 to 80° C. for the preparation of components (B)(1) and (B)(2). The pressure of the polymerization stage to prepare the fraction (A), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator. The polymerization pressure preferably ranges from 33 to 43 bar, if done in liquid phase, and from 5 to 30 bar if done in gas phase. The residence times relative to the two stages depend on the desired ratio between the fractions (A) and (B), and can usually range from 15 minutes to 8 hours. Conventional molecular weight regulators known in the art, such as chain transfer agents (e.g. hydrogen or $ZnEt_2$), may be used. The polyolefin compositions of the present invention find application particularly in the medical, automotive, packaging and electrical wires and cables covering fields, as well as for calendering materials and extrusion coatings. In particular, in medical applications, they may be used in the preparation of containers for plasma or intravenous solutions, or of phleboclysis tubes. Therefore, the present invention is further directed to an article comprising the above-described polyolefin composition. Depending on the properties needed for the different applications, the compositions of the invention may be used in combination with other elastomeric polymers such as ethylene/propylene copolymers (EPR), ethylene/propylene/diene terpolymers (EPDM), copolymers of ethylene with $C_4$-$C_{12}$ alpha-olefins (e.g. ethylene/octene-1 copolymers, such as the ones commercialized under the name Engage®) and mixtures thereof. Such elastomeric polymers may be present in an amount of 5 to 80% wt. of the total composition.

Conventional additives, fillers and pigments, commonly used in olefin polymers, may be added, such as nucleating agents, extension oils, mineral fillers, and other organic and inorganic pigments. The following analytical methods have been used to determine the properties reported in the detailed description and in the examples.

| Property | Method |
| --- | --- |
| Melt Flow Rate (MFR "L".) | ASTM D 1238 condition L |
| Ethylene content (% wt) | I.R. Spectroscopy |
| Intrinsic Viscosity | Determined in tetrahydronaphthalene at 135° C. |
| Flexural Modulus at 23° C. and Glass Transition Temperature (Tg) | Determined by way of a device for dynamic-mechanical measurements DMTA of Polymer Laboratories under the following conditions: frequency measure: 1 Hz; scanning temperature: 2° C./min. |
| | The polymer sample to be analyzed is made up of a 40 × 10 × 1 mm plaque taken from a sheet obtained by pressure molding with Carver press at 200° C., 10 tons (of pressure) for 10 minutes, and cooling at 100° C./min. |
| Shore Hardness D | ASTM D 2240 |
| Shore Hardness A | ASTM D 2240 |
| Tension set at 100% | MA17051 |
| Tensile strength at break | ASTM D 412-92 |
| Elongation at break | ASTM D 412-92 |
| Compression Set 25% at 23° C. | ASTM D 395 |
| Compression Set 25% at 70° C. | ASTM D 395 |
| Surface area | B.E.T. |
| Porosity | B.E.T. |
| Bulk density | DIN 53194 |

Determination of Solubility in Xylene at Room Temperature (% by Weight)

2.5 g of polymer were dissolved in 250 ml of xylene, at 135° C., under agitation. After 20 minutes, the solution was cooled to 25° C. under stirring, and then it was allowed to settle for 30 minutes.

The precipitate was filtered with filter paper; the solution was evaporated under a nitrogen current, and the residue dried under vacuum at 80° C. until reached constant weight. The weight percentage of polymer soluble in xylene at room temperature was then calculated. The percent by weight of polymer insoluble in xylene at room temperature was considered the isotactic index of the polymer. This value corresponded substantially to the isotactic index determined by extraction with boiling n-heptane, which by definition constitutes the isotactic index of polypropylene. Unless otherwise specified, the samples to be subjected to the various physical-mechanical analyses were molded by use of a Negri & Bossi injection press 90, after stabilizing the sample with IRGANOX R 1010 hindered phenolic stabilizer (0.05% by weight), and IRGAFOS 168 phosphite stabilizer (0.1% by weight), and pelletizing the sample with a twin-screw Berstorff extruder (barrel diameter 25 mm) at 210° C.

The conditions were as follows:

temperature of the melt: 220° C.;

temperature of the mold: 60° C.;

injection time: 9 sec;

cooling time: 15 sec.

The dimensions of the plaques for the tests were 127×127×2.5 mm. From these plaques, C-type dumbbells were cut and submitted to tensile strength tests with a head speed of 500 mm/min. Also the specimens for the tension set, compression set, flexural modulus, and hardness Shore A and D were cut from these plaques. All the specimens were cut parallel to the advancement front and consequently perpendicular to the flow direction.

The weight percentage of the sum of the (B)(1) and (2) fractions, indicated as % (B), is calculated by determining the weight of the mixture fed during the second stage and comparing it with the weight of the final product.

EXAMPLES 1-3

Preparation of the Catalyst System

A catalyst component comprising $MgCl_2.3C_2H_5OH$ adduct was prepared as follows:

28.4 g of anhydrous $MgCl_2$, 49.5 g of pure anhydrous ethanol, 100 ml of ROL OB/30 vaseline oil, and 100 ml of silicone oil (350 cs viscosity) were introduced in a flask immersed in a bath thermoregulated, at 120° C. under agitation, in an inert atmosphere, until the $MgCl_2$ was completely dissolved. The mixture was then transferred hot, always under an inert atmosphere, in a 150 ml container equipped with a heating jacket, and containing 150 ml of vaseline oil and 150 ml of silicone oil. The mixture was maintained at 120° C. and under agitation, the latter being carried out with a Hanke & Kunkel K.G. Ika Werke Ultra Turrax T45 N agitator. Said agitation continued for 3 minutes at 3000 rpm. The mixture was discharged into a 2 liter vessel containing 1000 ml of anhydrous n-heptane stirred and cooled so that the final temperature did not exceed 0° C. The $MgCl_2.3EtOH$ microspheres thus obtained were filtered and dried under vacuum at room temperature. The dried adduct obtained in this manner was then dealcoholated by heating at temperatures gradually increasing from 50° C. to 100° C., under nitrogen current, until the alcohol content was 1.1 moles per mole $MgCl_2$. The partially dealcoholated adduct thus obtained had a surface area of 11.5 $m^2/g$, a porosity of 0.13 and bulk density of 0.564 g/cc.

25 g of the obtained adduct were added, under stirring at 0° C., to 625 ml of $TiCl_4$. The mixture was then heated to 100° C. in 1 hour. When the temperature reached 40° C., diisobutylphthalate was added in an amount such that the Mg/diisobutylphtahalate molar ratio was 8. The resulting mixture was heated at 100° C. for 2 more hours, then allowed to settle, and the liquid was siphoned off hot. 550 ml of $TiCl_4$ were added and the mixture was heated at 120° C. for 1 hour. The obtained mixture was allowed to settle and the liquid was siphoned off hot. The solid was washed 6 times using 200 ml of anhydrous hexane at 60° C., and three more times using 200 ml of anhydrous hexane at room temperature.

After drying under vacuum, the solid presented porosity equal to 0.383 ml/g and surface area equal to 150 $m^2/g$.

General Polymerization Process

The polymerizations were done in stainless steel fluidized bed reactors.

During the polymerization, the gas phase in each reactor was continuously analyzed by gaschromatography in order to determine the content of ethylene, propylene and hydrogen. Ethylene, propylene and hydrogen were fed in such a way that during the course of the polymerization their concentration in gas phase remained constant, using instruments that measure and/or regulate the flow of the monomers. The operation was continuous in three stages, each one comprising the polymerization of propylene with ethylene in gas phase.

Propylene was prepolymerized in liquid propane in a 75 liters stainless steel loop reactor with an internal temperature of 20-25° C. in the presence of a catalyst system comprising a solid component (15-20 g/h) prepared as described above, and a mixture of 75-80 g/h Al-triethyl (TEAL) in a 10% hexane solution and an appropriate quantity of dicyclopenthyldmethoxysilane (DCPMS) donor, so that the TEAL/DCPMS wt. ratio was 5-6. The catalyst was prepared according to the process reported above.

1st Stage

The thus obtained prepolymer was discharged into the first gas phase reactor having the temperature reported in Table 1. Thereafter, hydrogen, propylene, ethylene and an inert gas were fed in the ratio and quantities reported in Table 1, to obtain the composition of the gas phase reported in said Table.

2nd Stage

After a sample was removed in order to carry out the various analyses, the polymer obtained from the first stage was discharged into the second phase reactor having the temperature and the pressure reported in Table 1. Thereafter, hydrogen, propylene, ethylene and an inert gas were fed in the ratio and quantities reported in Table 1, to obtain the composition of the gas phase reported in said Table.

3rd Stage

After a sample was removed in order to carry out the various analyses, the polymer obtained from the second stage was discharged into the third phase reactor, having the temperature and the pressure reported in Table 1. Thereafter, hydrogen, propylene, ethylene and an inert gas were fed in the ratio and quantities reported in Table 1, to obtain the composition of the gas phase reported in said Table.

At the end of the polymerization, the particulate polymer was discharged, at atmospheric pressure, into a vessel where a countercurrent steam was fed in order to strip the remaining monomers. Thereafter, the polymer was discharged into a vessel, where countercurrent nitrogen was fed at 80-90° C. in order to dry the polymer.

The operating conditions used in the above process and the results of the analyses performed on the polymer compositions obtained therefrom are shown in Tables 1 and 2 respectively.

Comparative Example 1

A polyolefin composition comprising:
31% by weight of a crystalline propylene/ethylene copolymer, having an ethylene content of 3.3% by weight and solubility in xylene at room temperature of 5.5% by weight, and
69% by weight of a propylene/ethylene elastomeric copolymer, having an ethylene content of 27% by weight, solubility in xylene at room temperature of 90.3% by weight and I.V. of the xylene soluble fraction of 3.20 dl/g;

was tested for comparison purposes. Said polyolefin composition was obtained as a reactor grade, in subsequent stages carried out in gas phase, in the presence of the catalyst system used in examples 1-3. The characteristics of the polymer composition obtained therefrom are reported in Table 2.

TABLE 1

|  | Example 1 | Example 2 | Example 3 |
| --- | --- | --- | --- |
| 1st stage (gas phase) |  |  |  |
| Split (% wt.) | 17 | 20 | 15 |
| Temperature (° C.) | 60 | 60 | 60 |
| Pressure (atm) | 14 | 14 | 14 |
| Time (minutes) | 68 | 61 | 68 |
| $H_2$ in gas phase (% mol) | 0.8 | 0.8 | 0.9 |
| Ethylene in gas phase (% mol) | 0.1 | 0.2 | 0.1 |
| Propylene in gas phase (% mol) | 9.0 | 10.2 | 8.8 |
| Ethylene in (A) (% wt) | 3.4 | 3.5 | 3.3 |
| MFR "L" (g/10 min) | 26 | 25 | 26 |
| Sol. Xyl. (% wt) | 7.5 | 7.5 | 7.5 |

TABLE 1-continued

|  | Example 1 | Example 2 | Example 3 |
|---|---|---|---|
| 2nd stage (gas phase) | | | |
| Split (% wt) | 56 | 57 | 54 |
| Temperature (° C.) | 65 | 65 | 65 |
| Pressure (gauge) (atm) | 18 | 18 | 18 |
| Time (minutes) | 39 | 53 | 39 |
| $H_2$ in gas phase (% mol) | 0.1 | 0.1 | 0.1 |
| Ethylene in gas phase (% mol) | 9.3 | 8.8 | 8.5 |
| Propylene in gas phase (% mol) | 53.5 | 54.2 | 53.9 |
| Ethylene in (B)(1) (% wt) | 27.2 | 27.2 | 27.8 |
| Ethylene tot. (% wt) | 21.7 | 21.0 | 22.5 |
| MFR "L" of (B)(1) (g/10 min) | 0.035 | 0.033 | 0.03 |
| MFR "L" tot. (g/10 min) | 0.16 | 0.18 | 0.13 |
| Sol. Xyl. In (B)(1) (% wt) | 92.8 | 92.0 | 91.1 |
| Sol. Xyl. tot. (% wt) | 72.9 | 70.1 | 72.9 |
| I.V. Sol. Xyl. (dl/g) | 4.16 | 3.88 | 4.16 |
| 3rd stage (gas phase) | | | |
| Split (% wt) | 27 | 23 | 31 |
| Temperature (° C.) | 65 | 65 | 65 |
| Pressure (gauge) (atm) | 18 | 18 | 18 |
| Time (minutes) | 96 | 95 | 96 |
| $H_2$ in gas phase (% mol) | 0.2 | 0.2 | 0.2 |
| Ethylene in gas phase (% mol) | 14.3 | 14.6 | 14.4 |
| Propylene in gas phase (% mol) | 52.6 | 52.7 | 52.4 |
| Ethylene in (B)(2) (% wt) | 38 | 38.1 | 38 |
| MFR "L" in (B)(2) (g/10 min) | 0.002 | 0.016 | 0.02 |
| Sol. Xyl. in (B)(2) (% wt) | 87.8 | 88.0 | 90.1 |
| I.V. Sol. Xyl. (B)(2)(dl/g) | 5.98 | 6.26 | 5.31 |

TABLE 2

|  | Example 1 | Example 2 | Example 3** | Comp. Ex. 1 |
|---|---|---|---|---|
| MFR "L" (g/10 min) | 0.05 | 0.11 | 0.60 | 0.60 |
| Sol. Xyl. (% wt) | 76.9 | 74.2 | 78.3 | 64.0 |
| Ethylene content (% wt.) | 26.1 | 25.0 | 27.3 | 19.6 |
| I.V. Sol. Xyl. (dl/g) | 4.72 | 4.53 | 4.57 | 3.20 |
| Flexural Modulus (MPa) | 20 | 33 | 16 | 75 |
| Glass Temperature (° C.) | −23 | −23 | −23 | −20 |
| Tensile Strength at Break (MPa) | 5.5 | 11.7 | 11.2 | 19.2 |
| Elongation at Break (MPa) | 350 | 706 | >900 | 960 |
| Hardness Shore A | 77* | 80* | 75* | 89* |
| Hardness Shore D | 26 | 27 | 22 | 30 |
| Tension Set 100% at 23° C. (%) | 22 | 26 | 29 | 37 |
| Compression Set 25% at 23° C. (%) | 35 | 35 | 37 | 36 |
| Compression Set 25% at 70° C. (%) | 64 | 66 | 70 | 69 |

*Shore A was evaluated after 5 seconds.
**The properties were measured on the polymer composition obtained, after visbreaking with peroxide (100 ppm Luperox 101) in a twin screw Berstorff extruder. Before visbreaking, the polymer of Example 3 showed MFR"L" of 0.07 g/10 min and I.V. Sol. Xyl. of 4.57 dl/g. The above results demonstrate that the polyolefin compositions according to the present invention are much more flexible that the ones obtainable with the methods known in the state of the art. More specifically, the flexural modulus, hardness and tension set values of the compositions of Examples 1-3 are much lower than the ones of the composition of Comp. Ex. 1.

The invention claimed is:

1. A polyolefin composition comprising the following fractions:

(A) from 8 to 25% by weight of a crystalline polymer fraction selected from the group consisting of:

(i) a propylene homopolymer, having solubility in xylene at room temperature lower than 10% by weight; and (ii) a copolymer of propylene and at least one alpha-olefin of formula $H_2C=CHR$, where R is H or a $C_{2-6}$ linear or branched alkyl, containing at least 85% by weight of propylene, having solubility in xylene at room temperature lower than 15% by weight; and (B) from 75 to 92% by weight of an elastomeric fraction comprising:

(1) a first elastomeric copolymer of propylene with at least one alpha-olefin of formula $H_2C=CHR$, where R is H or a $C_{2-6}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and (2) a second elastomeric copolymer of propylene with at least one alpha-olefin of formula $H_2C=CHR$, where R is H or a $C_{2-6}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;

wherein a (1)/(2) weight ratio ranges from 1:5 to 5:1, and the polyolefin composition has a flexural modulus lower than 60 MPa, a Shore A hardness lower than 90, and a tension set at 100% lower than 35%.

2. The polyolefin composition according to claim 1, wherein the amount of the fraction (A) ranges from 12 to 18% by weight.

3. The polyolefin composition according to claim 1, wherein the fraction (A) is a propylene homopolymer (i) having solubility in xylene at room temperature lower than 5% by weight.

4. The polyolefin composition according to claim 1, wherein the fraction (A) is a copolymer of propylene (ii) containing at least 90% by weight of propylene, having solubility in xylene at room temperature lower than 10% by weight.

5. The polyolefin composition according to claim 1, wherein the copolymer of propylene (ii) is a copolymer of propylene and ethylene.

6. The polyolefin composition according to claim 1, wherein said first elastomeric copolymer (1) of the fraction (B) contains from 25 to 30% by weight alpha-olefin and has solubility in xylene at room temperature greater than 70% by weight, the intrinsic viscosity of the xylene soluble fraction ranging from 3.5 to 4.5 dug.

7. The polyolefin composition according to claim 1, wherein said second elastomeric copolymer (2) of the fraction (B) contains from 35 to 40% by weight alpha-olefin and has solubility in xylene at room temperature greater than 85% by weight, the intrinsic viscosity of the xylene soluble fraction ranging from 4.5 to 6.0 dl/g.

8. The polyolefin composition according to claim 1, wherein the elastomeric copolymers (1) and (2) of the fraction (B) are copolymers of propylene with ethylene.

9. The polyolefin composition according to claim 1, wherein the flexural modulus ranges from 10 to 50 MPa, the Shore A hardness ranges from 65 to 80, and the tension set at 100% ranges from 10 to 30%.

10. The polyolefin composition according to claim 1, wherein the composition is in the form of spherical particles having an average diameter of 250 to 7000 microns, a flowability of less than 30 seconds and a bulk density (compacted) greater than 0.4 g/ml.

11. The polyolefin composition according to claim 1, wherein the composition is obtained by sequential polymerization in at least two stages, carried out in the presence of a catalyst comprising a trialkylaluminum compound, optionally an electron donor, and a solid catalyst component comprising a halide or halogen-alcoholate of Ti and an electron-donor compound supported on anhydrous magnesium chloride.

12. A process for the preparation of a polyolefin composition comprising the following fractions:
  (A) from 8 to 25% by weight of a crystalline polymer fraction selected from the group consisting of:
    (i) a propylene homopolymer, having solubility in xylene at room temperature lower than 10% by weight; and
    (ii) a copolymer of propylene and at least one alpha-olefin of formula $H_2C=CHR$, where R is H or a $C_{2-6}$ linear or branched alkyl, containing at least 85% by weight of propylene, having solubility in xylene at room temperature lower than 15% by weight; and
  (B) from 75 to 92% by weight of an elastomeric fraction comprising:
    (1) a first elastomeric copolymer of propylene with at least one alpha-olefin of formula $H_2C=CHR$, where R is H or a $C_{2-6}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and
    (2) a second elastomeric copolymer of propylene with at least one alpha-olefin of formula $H_2C=CHR$, where R is H or a $C_{2-6}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;
  wherein a (1)/(2) weight ratio ranges from 1:5 to 5:1, and the polyolefin composition has a flexural modulus lower than 60 MPa, a Shore A hardness lower than 90, and a tension set at 100% lower than 35%;
  the process comprising at least two sequential polymerization stages with each subsequent polymerization being conducted in the presence of the polymeric material formed in the immediately preceding polymerization reaction, wherein the crystalline polymer fraction (A) is prepared in at least one first stage, and the elastomeric polymer fraction (B) is prepared in at least one second stage, all polymerization stages being carried out in the presence of a catalyst comprising a trialkylaluminum compound, optionally an electron donor, and a solid catalyst component comprising a halide or halogen-alcoholate of Ti and an electron-donor compound supported on anhydrous magnesium chloride, said solid catalyst component having a surface area (measured by BET) of less than 200 $m^2/g$, and a porosity (measured by BET) greater than 0.2 ml/g.

13. The process according to claim 12, wherein the solid catalyst component has a surface area (measured by BET) ranging from 80 to 170 $m^2/g$, and a porosity (measured by BET) ranging from 0.25 to 0.5 ml/g.

14. The process according to claim 12, wherein the polymerization of the crystalline polymer fraction (A) is carried out in liquid monomer, and the polymerization of the elastomeric fraction (B) is carried out in gas phase.

15. The process according to claim 12, wherein the sequential polymerization stages are all carried out in gas phase.

16. An article comprising the polyolefin composition comprising the following fractions:
  (A) from 8 to 25% by weight of a crystalline polymer fraction selected from the group consisting of:
    (i) a propylene homopolymer, having solubility in xylene at room temperature lower than 10% by weight; and
    (ii) a copolymer of propylene and at least one alpha-olefin of formula $H_2C=CHR$, where R is H or a $C_{2-6}$ linear or branched alkyl, containing at least 85% by weight of propylene, having solubility in xylene at room temperature lower than 15% by weight; and
  (B) from 75 to 92% by weight of an elastomeric fraction comprising:
    (1) a first elastomeric copolymer of propylene with at least one alpha-olefin of formula $H_2C=CHR$, where R is H or a $C_{2-6}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and
    (2) a second elastomeric copolymer of propylene with at least one alpha-olefin of formula $H_2C=CHR$, where R is H or a $C_{2-6}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;
wherein a (1)/(2) weight ratio ranges from 1:5 to 5:1, and the polyolefin composition has a flexural modulus lower than 60 MPa, a Shore A hardness lower than 90, and a tension set at 100% lower than 35%.

17. A polyolefin composition comprising the following fractions:
(A) from 8 to 25% by weight of a crystalline polymer fraction selected from the group consisting of:
(i) a propylene homopolymer, having solubility in xylene at room temperature lower than 10% by weight; and
(ii) a copolymer of propylene and at least one alpha-olefin of formula $H_2C=CHR$, where R is H or a $C_{2-6}$ linear or branched alkyl, containing at least 85% by weight of propylene, having solubility in xylene at room temperature lower than 15% by weight; and
(B) from 75 to 92% by weight of an elastomeric fraction comprising:
(1) a first elastomeric copolymer of propylene with at least one alpha-olefin of formula $H_2C=CHR$, where R is H or a $C_{2-6}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and
(2) a second elastomeric copolymer of propylene with at least one alpha-olefin of formula $H_2C=CHR$, where R is H or a $C_{2-6}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;
wherein a (1)/(2) weight ratio ranges from 1:5 to 5:1, and the polyolefin composition has a flexural modulus lower than 60 MPa, a Shore A hardness lower than 90, and a tension set at 100% lower than 35%, and wherein the crystalline polymer fraction (A) and the elastomeric fraction (B) are obtained by sequential polymerization in at least two polymerization stages, the polymerization stages being carried out in presence of a Ziegler-Natta catalyst comprising a trialkylaluminum compound, optionally an electron donor, and a solid catalyst component comprising a halide or halogen-alcoholate of Ti and an electron-donor compound supported on anhydrous magnesium chloride.

18. The polyolefin composition according to claim 17, wherein the amount of the fraction (A) ranges from 12 to 18% by weight.

19. The polyolefin composition according to claim 17, wherein the fraction (A) is a propylene homopolymer (i) having solubility in xylene at room temperature lower than 5% by weight.

20. The polyolefin composition according to claim 17, wherein the fraction (A) is a copolymer of propylene (ii) containing at least 90% by weight of propylene, having solubility in xylene at room temperature lower than 10% by weight.

21. The polyolefin composition according to claim 17, wherein the copolymer of propylene (ii) is a copolymer of propylene and ethylene.

22. The polyolefin composition according to claim 17, wherein said first elastomeric copolymer (1) of the fraction (B) contains from 25 to 30% by weight alpha-olefin and has solubility in xylene at room temperature greater than 70% by weight, the intrinsic viscosity of the xylene soluble fraction ranging from 3.5 to 4.5 dl/g.

23. The polyolefin composition according to claim 17, wherein said second elastomeric copolymer (2) of the fraction (B) contains from 35 to 40% by weight alpha-olefin and has solubility in xylene at room temperature greater than 85% by weight, the intrinsic viscosity of the xylene soluble fraction ranging from 4.5 to 6.0 dl/g.

24. The polyolefin composition according to claim 17, wherein the elastomeric copolymers (1) and (2) of the fraction (B) are copolymers of propylene with ethylene.

25. The polyolefin composition according to claim 17, wherein the flexural modulus ranges from 10 to 50 MPa, the Shore A hardness ranges from 65 to 80, and the tension set at 100% ranges from 10 to 30%.

26. The polyolefin composition according to claim 17, wherein the composition is in the form of spherical particles having an average diameter of 250 to 7000 microns, a flowability of less than 30 seconds and a bulk density (compacted) greater than 0.4 g/ml.

27. A polyolefin composition comprising the following fractions:
(A) from 8 to 25% by weight of a crystalline polymer fraction selected from the group consisting of:
(i) a propylene homopolymer, having solubility in xylene at room temperature lower than 10% by weight; and
(ii) a copolymer of propylene and at least one alpha-olefin of formula $H_2C=CHR$, where R is H or a $C_{2-6}$ linear or branched alkyl, containing at least 85% by weight of propylene, having solubility in xylene at room temperature lower than 15% by weight; and
(B) from 75 to 92% by weight of an elastomeric fraction comprising:
(1) a first elastomeric copolymer of propylene with at least one alpha-olefin of formula $H_2C=CHR$, where R is H or a $C_{2-6}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and
(2) a second elastomeric copolymer of propylene with at least one alpha-olefin of formula $H_2C=CHR$, where R is H or a $C_{2-6}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;
wherein a (1)/(2) weight ratio ranges from 1:5 to 5:1, and the polyolefin composition has a flexural modulus lower than 60 MPa, a Shore A hardness lower than 90, and a tension set at 100% lower than 35%, and wherein the crystalline polymer fraction (A) and the elastomeric fraction (B) are obtained by sequential polymerization in three polymerization stages, the three polymerization stages being carried out in presence of a Ziegler-Natta catalyst comprising a trialkylaluminum compound, optionally an electron donor, and a solid catalyst component comprising a halide or halogen-alcoholate of Ti and an electron-donor compound supported on anhydrous magnesium chloride.

28. The polyolefin composition according to claim 27, wherein the amount of the fraction (A) ranges from 12 to 18% by weight.

29. The polyolefin composition according to claim 27, wherein the fraction (A) is a propylene homopolymer (i) having solubility in xylene at room temperature lower than 5% by weight.

30. The polyolefin composition according to claim 27, wherein the fraction (A) is a copolymer of propylene (ii)

containing at least 90% by weight of propylene, having solubility in xylene at room temperature lower than 10% by weight.

31. The polyolefin composition according to claim 27, wherein the copolymer of propylene (ii) is a copolymer of propylene and ethylene.

32. The polyolefin composition according to claim 27, wherein said first elastomeric copolymer (1) of the fraction (B) contains from 25 to 30% by weight alpha-olefin and has solubility in xylene at room temperature greater than 70% by weight, the intrinsic viscosity of the xylene soluble fraction ranging from 3.5 to 4.5 dl/g.

33. The polyolefin composition according to claim 27, wherein said second elastomeric copolymer (2) of the fraction (B) contains from 35 to 40% by weight alpha-olefin and has solubility in xylene at room temperature greater than 85% by weight, the intrinsic viscosity of the xylene soluble fraction ranging from 4.5 to 6.0 dl/g.

34. The polyolefin composition according to claim 27, wherein the elastomeric copolymers (1) and (2) of the fraction (B) are copolymers of propylene with ethylene.

35. The polyolefin composition according to claim 27, wherein the flexural modulus ranges from 10 to 50 MPa, the Shore A hardness ranges from 65 to 80, and the tension set at 100% ranges from 10 to 30%.

36. The polyolefin composition according to claim 27, wherein the composition is in the form of spherical particles having an average diameter of 250 to 7000 microns, a flowability of less than 30 seconds and a bulk density (compacted) greater than 0.4 g/ml.

37. The process according to claim 12, wherein the flexural modulus ranges from 10 to 50 MPa.

38. The article according to claim 16, wherein the flexural modulus ranges from 10 to 50 MPa.

39. The polyolefin composition according to claim 1, wherein the flexural modulus is lower than 50 MPa.

40. The process according to claim 12, wherein the flexural modulus is lower than 50MPa.

41. The article according to claim 16, wherein the flexural modulus is lower than 50MPa.

42. The polyolefin composition according to claim 17, wherein the flexural modulus is lower than 50 MPa.

43. The polyolefin composition according to claim 27, wherein the flexural modulus is lower than 50 MPa.

* * * * *